United States Patent
Yuasa

(10) Patent No.: US 9,286,215 B2
(45) Date of Patent: Mar. 15, 2016

(54) METHOD AND APPARATUS FOR CONTROLLING CACHE MEMORY AREAS

(75) Inventor: Kentarou Yuasa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1124 days.

(21) Appl. No.: 13/013,729

(22) Filed: Jan. 25, 2011

(65) Prior Publication Data

US 2011/0191535 A1    Aug. 4, 2011

(30) Foreign Application Priority Data

Feb. 1, 2010  (JP) ................. 2010-020543

(51) Int. Cl.
  *G06F 12/16* (2006.01)
  *G06F 12/08* (2006.01)
  *G06F 1/30* (2006.01)
  *G06F 1/32* (2006.01)

(52) U.S. Cl.
  CPC ...... *G06F 12/08* (2013.01); *G06F 1/30* (2013.01); *G06F 1/32* (2013.01); *G06F 12/0804* (2013.01); *G06F 12/0871* (2013.01); *G06F 2212/2228* (2013.01); *Y02B 60/1225* (2013.01)

(58) Field of Classification Search
  CPC ..... G06F 1/32–1/3296; G06F 12/08–12/0897; G06F 2212/27–2212/286; G06F 12/0871; G06F 1/30–1/305; G06F 12/0223–12/0292; G06F 17/30147
  USPC ......... 711/113, 138–139, 142–143, 145, 154, 711/163, 173; 713/340; 714/14–24
  See application file for complete search history.

(56) References Cited

U.S. PATENT DOCUMENTS

| | | | |
|---|---|---|---|
| 5,892,937 A * | 4/1999 | Caccavale | 711/135 |
| 7,062,675 B1 * | 6/2006 | Kemeny et al. | 714/15 |
| 2004/0054851 A1 * | 3/2004 | Acton et al. | 711/118 |
| 2005/0278486 A1 * | 12/2005 | Trika et al. | 711/142 |
| 2008/0189484 A1 * | 8/2008 | Iida et al. | 711/114 |
| 2010/0275049 A1 * | 10/2010 | Balakrishnan et al. | 713/324 |
| 2010/0325365 A1 * | 12/2010 | Colglazier | 711/136 |

FOREIGN PATENT DOCUMENTS

| | | |
|---|---|---|
| JP | 05-011930 | 1/1993 |
| JP | 2006-313407 A | 11/2006 |
| JP | 2007-011672 | 1/2007 |
| JP | 2008-176627 | 7/2008 |
| JP | 2008-204935 A | 9/2008 |
| WO | WO 2010/064280 * | 6/2010 ............. G06F 3/06 |

OTHER PUBLICATIONS

Japanese Office Action mailed by JPO and corresponding to Japanese Application No. 2010-020543 on Sep. 17, 2013, with partial English translation.

* cited by examiner

*Primary Examiner* — Adam M Queler
*Assistant Examiner* — Nicholas Simonetti
(74) *Attorney, Agent, or Firm* — Fujitsu Patent Center

(57) ABSTRACT

According to an aspect of the embodiment, a cache controller sets, when power supply capacity information is acquired at an update period, a size of a permitted area in which the writing of dirty data is permitted and a size of an inhibited area in which the writing of the dirty data is inhibited in a cache memory, according to the power supply capacity information. The cache controller stores the dirty data or read data read out from a disk array in the permitted area, or stores only the read data in the inhibited area.

9 Claims, 9 Drawing Sheets

| BATTERY TYPE | CHARGE AMOUNT X [%] | DETERIORATION COEFFICIENT Y |
|---|---|---|
| BATTERY UNIT A | 90 | 0.9 |
| BATTERY UNIT B | 80 | 0.9 |
| BATTERY UNIT C | 80 | 0.9 |

FIG. 3A

| MEMORY BANK No. | DIRTY DATA LIMIT FLAG | DIRTY DATA AMOUNT [MB] |
|---|---|---|
| #1 | 0 | 512 |
| #2 | 0 | 256 |
| . | . | . |
| . | . | . |
| . | . | . |
| #32 | 1 | 0 |

FIG. 3B

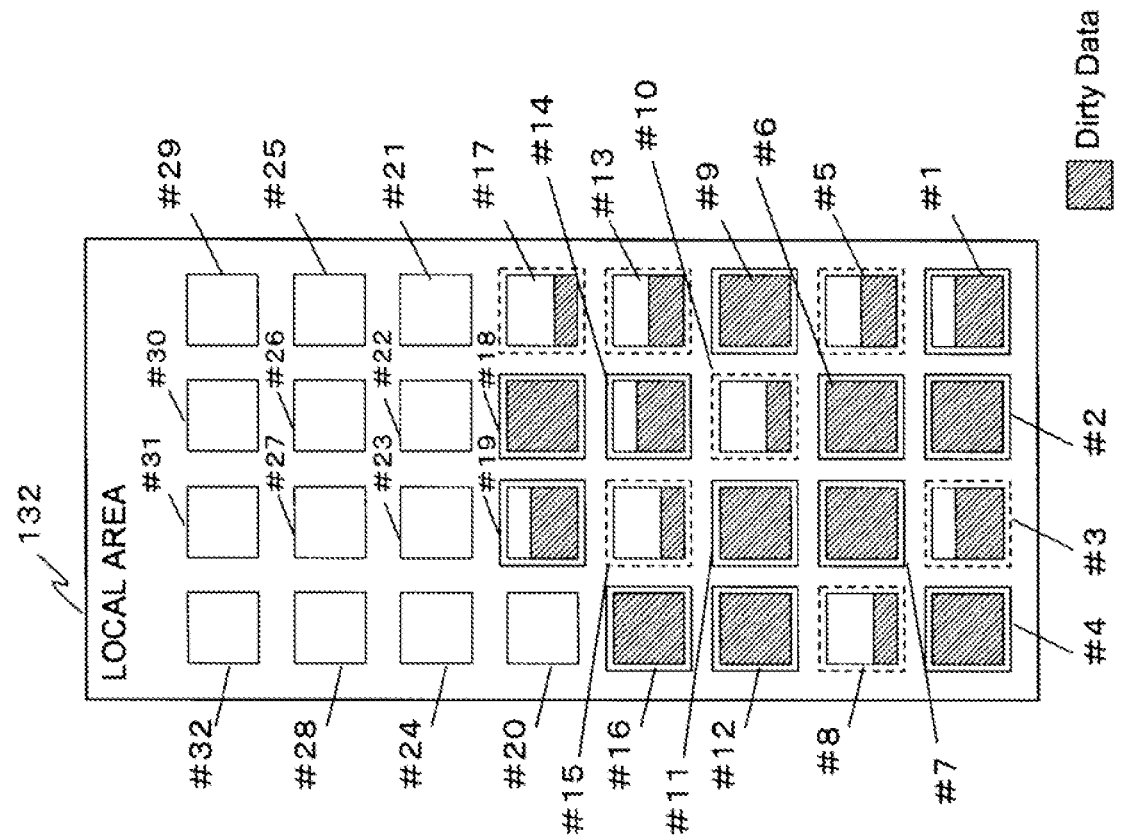
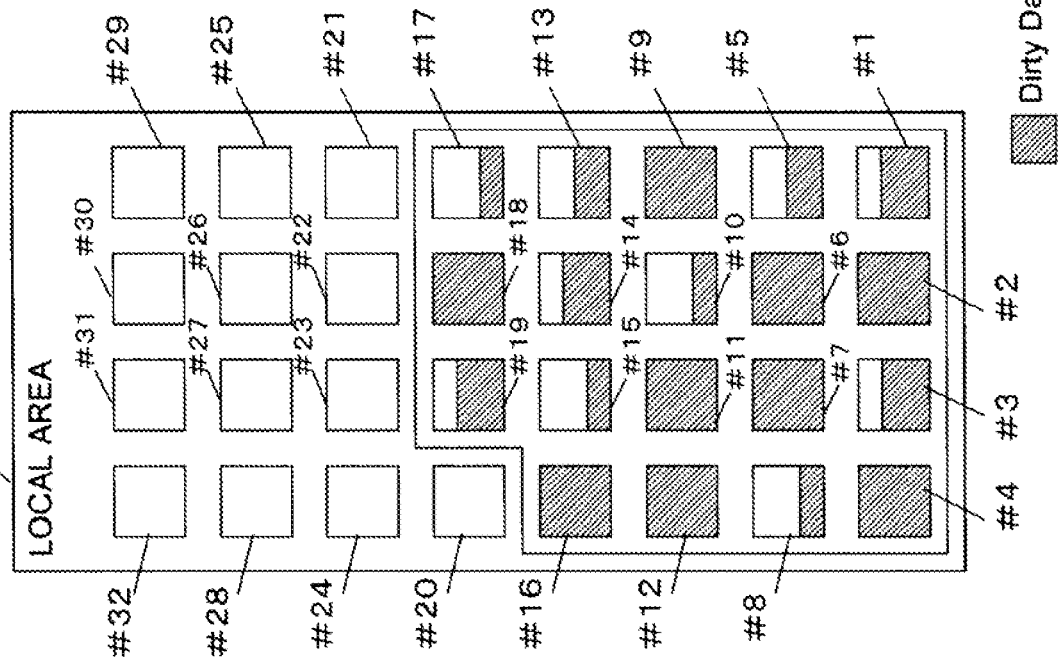

METHOD AND APPARATUS FOR CONTROLLING CACHE MEMORY AREAS

CROSS-REFERENCE TO RELATED APPLICATIONS

This application is based upon and claims the benefit of priority of the prior Japanese Patent Application No. 2010-20543, filed on Feb. 1, 2010, the entire contents of which are incorporated herein by reference.

FIELD

The embodiments discussed herein are related to a method for controlling a disk array apparatus, and a disk array apparatus.

BACKGROUND

A disk array apparatus incorporates a cache as a high-speed device (a disk cache memory) to thereby reduce access time to data. For example, when the disk array apparatus receives a write request for data from a host computer, the disk array apparatus once stores the data in the cache, and notifies the host computer of a completion of a processing. In other words, the disk array apparatus makes a data processing time look short for the host computer by performing a processing for writing the data in the cache rather than in a disk or a magnetic disk ("write processing in a write-back state"). The data which is written in the cache and is not written in the disk is called "dirty data". The dirty data is written in the disk after the disk array apparatus notifies the host computer of the completion of the processing.

In a dirty data processing method, a dirty data processing apparatus, and a dirty data processing program, it is proposed to monitor battery remaining power of a storage device, to control an allowed amount of dirty data in a cache memory included in the storage device according to the battery remaining power, to perform write-through operation when the allowed amount of the dirty data is equal to or smaller than a threshold, and to perform write-back operation when the allowed amount of the dirty data is larger than the threshold.

In a battery management system chip having a function of flexibly expanding a control rule, it is proposed to externally attach a nonvolatile memory, in which an application program for battery management is stored, to a battery management chip, in which a central processing unit (CPU), a ROM and ROM_RAM decoder, and an SRAM are built-in, to write data stored in the nonvolatile memory into the SRAM at the time of power-on or reset of a main body, and to write data stored in the SRAM back to the nonvolatile memory thereby the data is stored in the nonvolatile memory again before the main body is shut down.

Patent Document 1: Japanese Laid-Open Patent Publication No. 2006-313407
Patent Document 2: Japanese Laid-Open Patent Publication No. 2008-204935.

The dirty data, which is written in the cache memory, is not written in the disk, which is a nonvolatile storage device, yet at that point. When an electric power failure of a main power supply or the like occurs and a power supply to the cache memory is stopped before a write processing of the dirty data in the disk is performed, the dirty data is lost. Therefore, it is necessary to protect the dirty data stored in the cache memory.

For the protection of the dirty data, a backup processing for the dirty data is executed. For example, a method is adopted which supplies electric power to the cache memory from a backup power supply, and stores data for several tens hours, when the electric power failure of the main power supply occurs. Alternatively, a method is adopted which causes only a part of the disk array apparatus to operate and forcibly writes the dirty data into the disk array apparatus, which is a nonvolatile device.

However, an allowed amount of the dirty data is an amount of the dirty data which can be actually protected by the backup power supply at that point. The power supply capacity of the backup power supply gradually falls because of, for example, aged deterioration, a charging state, and the like. On the other hand, a threshold of the allowed amount of the dirty data is fixed. Therefore, when the power supply capacity of the backup power supply falls to be equal to or lower than the threshold, the disk array apparatus is forcibly shifted from a write-back state at that time to a write-through state.

Because of this shift, when the disk array apparatus receives a write request of data from the host computer, the disk array apparatus can notify a completion of a write processing only after the disk array apparatus writes the data into a disk. Therefore, data processing time becomes long. In addition, the disk array apparatus operates in the write-through state until the power supply capacity of the backup power supply increases to be larger than the threshold. Therefore, a period in which the data processing time is long continues for a long time.

SUMMARY

According to an aspect of the embodiment, a method for controlling a disk array apparatus disclosed herein is a control method for a disk array apparatus which includes a disk array, a cache memory, a battery that supplies electric power to the cache memory during the electric power failure of a main power supply, and a cache controller that stores data in the cache memory. The method for controlling the disk array apparatus includes: acquiring power supply capacity information indicating power supply capacity of the battery at an update period; setting a size of a permitted area and a size of an inhibited area in the cache memory according to the power supply capacity information when the power supply capacity information is acquired, the permitted area being an area in which the writing of dirty data is permitted, the inhibited area being an area in which the writing of the dirty data is inhibited, the dirty data being write data that is to be written in the disk array and is not written in the disk array; and storing the dirty data or read data in the permitted area, or storing only the read data in the inhibited area, the read data being read out from the disk array.

According to the method for controlling the disk array apparatus disclosed herein, it is possible to dynamically allocate a dirty data inhibited area in the cache memory according to the power supply capacity of the backup power supply due to aged deterioration, a charging state, and the like. This makes it possible to reduce a period in which writing speed performance falls because the disk array apparatus operates in the write-through state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A is a diagram illustrating an example of a battery table;

FIG. 3B is a diagram illustrating an example of a cache table;

FIGS. 8A and 8B are diagrams for explaining data storage in a local area on a cache memory.

DESCRIPTION OF EMBODIMENTS

Preferred embodiments of the present invention will be explained with reference to accompanying drawings.

First Embodiment

Figure 1:
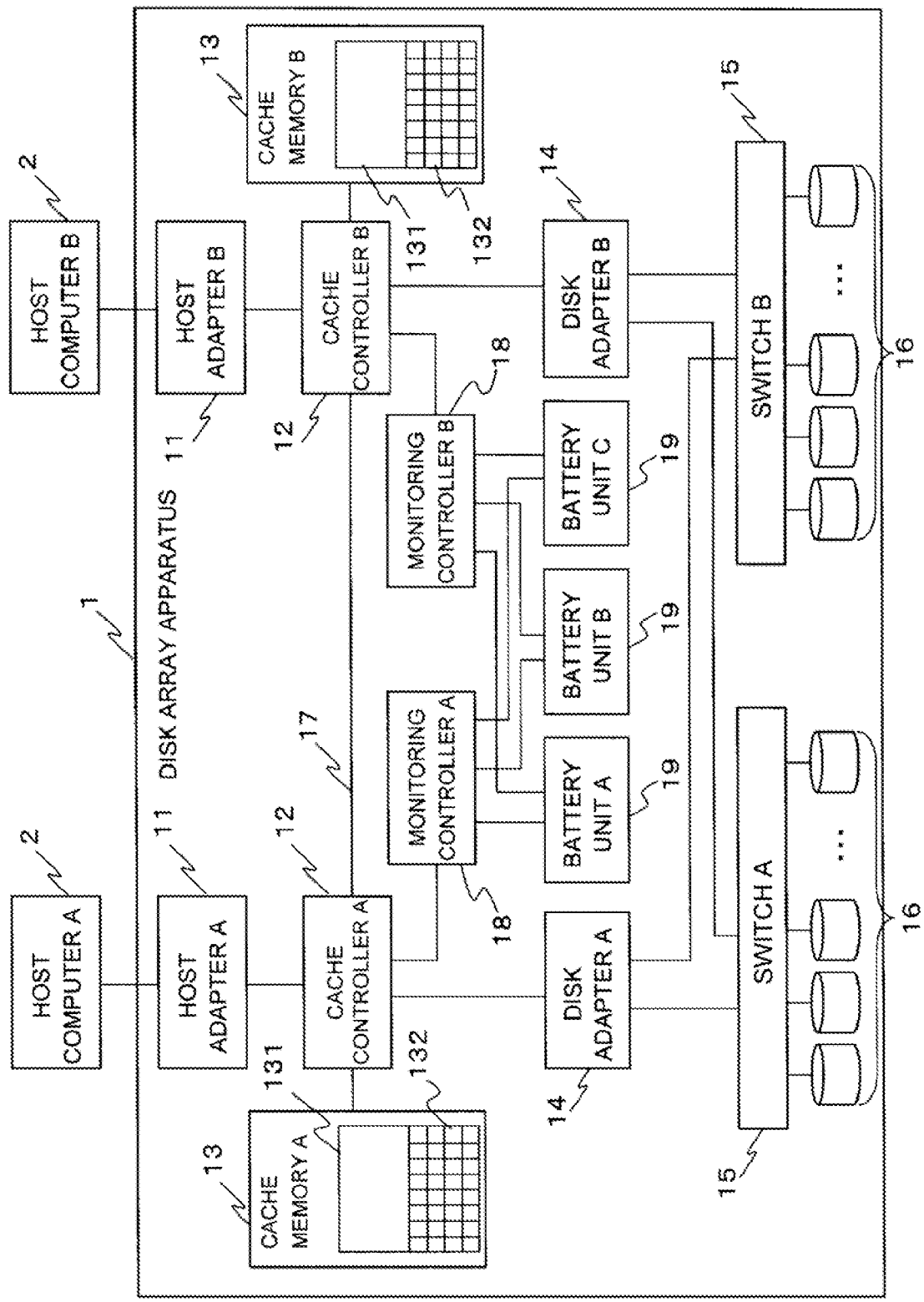
FIG. 1 is a diagram illustrating the configuration of a disk array apparatus.

FIG. 1 is a diagram illustrating the configuration of a disk array apparatus.

A disk array apparatus 1 includes two host adapters 11, two cache controllers 12, two disk adapters 14, two switches 15, two disk arrays 16, a cache-to-cache signal line 17, two monitoring controllers 18, and a plurality of battery units 19. Each of the two cache controller 12 includes a cache memory 13 which temporarily stores data.

The disk array apparatus 1 is connected to two host computers 2. The disk array apparatus 1 receives data from the host computers 2, and writes the data in the disk arrays 16, in response to a write request from the host computers 2. The disk array apparatus 1 reads out data from the disk arrays 16, and transmits the data to the host computers 2, in response to a read request from the host computers 2.

The cache controller 12 is provided to correspond to the host computer 2. The host adapter 11, the cache memory 13, the disk adapter 14, the switch 15, the disk arrays 16, and the monitoring controller 18 are provided to correspond to the cache controller 12.

Therefore, this computer system or the disk array apparatus 1 performs duplexing of data, in other words, mirroring in order to improve reliability of the data. When the two host computers 2 are distinguished, the host computers 2 are represented as, for example, a "host computer A" and a "host computer B". The cache controller 12 corresponding to the "host computer A" is represented as a "cache controller A". The same applies to the host adapters 11, the cache memories 13, the disk adapters 14, the switches 15, and the battery units 19.

Each host adapter 11 is connected between each host computer 2 and each cache controller 12, and controls data transfer between each host computer 2 and the disk array apparatus 1. For example, the host adapter 11 receives a write request and write data from the host computer 2, and transfers the write request to the cache controller 12. "Write data" is data that is to be written in the disk arrays 16. The host adapter 11 receives a read request from the host computer 2, and transfers the read request to the cache controller 12. Then, the host adapter 11 receives a read data from the cache controller 12, and transfers the read data to the host computer 2 as responses to the read request. "Read data" is data which is read out from the disk arrays 16.

The cache controller 12 controls the writing of data in the cache memories 13 or the disk arrays 16 according to the write request received from the host computer 2. The cache controller 12 controls the reading of the data from the cache memory 13 or the disk arrays 16 according to the read request received from the host computer 2. The cache controller A and the cache controller B are connected to each other by the cache-to-cache signal line 17.

The cache memories 13 are volatile memories sufficiently higher in speed than the disk arrays 16, for example, semiconductor memories such as DRAMs (Dynamic Random Access Memories). Each cache memory 13 is connected to each cache controller 12. The write data transferred from the host computer 2 or the read data read out from the disk arrays 16 is temporarily stored in the cache memory 13. The write data which is written in the cache memory 13 and is not written in the disk arrays 16 yet is referred to as "dirty data". Each cache memory 13 includes mirror areas 131 and local areas 132. The mirror areas 131 and the local areas 132 are explained later with reference to FIG. 2.

On the other hand, the disk arrays 16 are nonvolatile memories having lower speed than that of the cache memories 13 which are high speed memories, and include a plurality of magnetic disks. The disk arrays 16 are connected to each cache controller 12 via each switch 15 and each disk adapter 14.

When the cache controller 12 receives the write request and write data during operation in a "write-back state", the cache controller 12 writes the write data in the cache memory 13, and then, notifies the host adapter 11, which is a transfer source of the write request, of the completion of the writing. The host adapter 11 that receives this notification notify the host computer 2, which is a request source of the write request, of the completion of the writing. Then, the write data stored in the cache memory 13, in other words, the dirty data is written in the disk arrays 16 by the cache controller 12 via the disk adapter 14.

When the cache controller 12 receives the write request and the write data during operation in a "write-through state", the cache controller 12 once writes the write data in the cache memory 13, then reads out the write data written in the cache memory 13, and writes the write data in the disk arrays 16, and then, notifies the host adapter 11, which is the transfer source of the write request, of the completion of the writing. The host adapter 11 that receives this notification notifies the host computer 2, which is the request source of the write request, of the completion of the writing.

The cache controller 12 generates and maintains state information. The state information indicates an operation mode of the disk array apparatus 1. Specifically, the state information indicates whether a state of write processing of write data is the "write-back state" or the "write-through state". For example, usually, since the battery units 19 are charged, the state information is the "write-back state", for example, in initialization processing of the disk array apparatus 1. The state information is provided separately from a dirty data limit flag, which is explained later.

Each of the cache controller A and the cache controller B generates state information independently from each other. For example, when the cache controller A changes the state information from the "write-through state" to the "write-back state", the cache controller A notifies the cache controller B of the change of the state information via the cache-to-cache signal line 17. When the cache controller B changes the state information from the "write-through state" to the "write-back state", the cache controller B notifies the cache controller A of the change of the state information via the cache-to-cache signal line 17. Consequently, the state information in the cache controller A and the state information in the cache controller B are matched.

When the cache controller 12 receives the read request, the cache controller 12 search through the cache memory 13 to find whether requested data exists or not in the cache memory 13. Specifically, the cache controller 12 search through lists for managing what kind of data is stored in the cache memory 13. When the requested data (read data) exists in the cache memory 13, the cache controller 12 reads out the requested read data from the cache memory 13, and transmits the read data to the host adapter 11. The host adapter 11 transmits the received read data to the host computer 2.

When the requested data does not exist in the cache memory 13, the cache controller 12 directly reads out the requested data from the disk arrays 16, and transmits the requested data to the host adapter 11. The host adapter 11 transmits the received data to the host computer 2. Since it is likely that the same data is read out again, the cache controller 12 may transmit the data read out from the disk arrays 16 to the host computer 2 after once storing the data in the cache memory 13.

Each disk adapter 14 is provided between each cache controller 12 and each switch 15, and controls data transfer between the cache controller 12 and the switch 15. For example, the disk adapter 14 receives a write command and one of dirty data and write data from the cache controller 12, and transfers the write command and the dirty data or the write data to the switch 15. The write command is generated by the cache controller 12 based on the write request. The disk adapter 14 receives a read command from the cache controller 12, and transfers the read command to the switch 15. Then, the disk adapter 14 receives the read data from the switch 15, and transfers the read data to the cache controller 12 as responses to the read command. The read command is generated by the cache controller 12 based on the read request.

When the switch 15 receives the write command, the switch 15 transfers the write command and the received dirty data or write data to the disk devices as a writing targets among the plurality of disk devices of the disk arrays 16. When the switch 15 receives the read command, the switch 15 transfers the read command to the disk devices as a reading targets among the plurality of disk devices of the disk arrays 16, and transfers data (read data) read out from the disk devices, which is the reading targets, to the cache controller 12 via the disk adapter 14.

As explained above, the cache controller A and the cache controller B are connected to each other. For example, data stored in the local area 132, which is explained later, of the cache memory A is copied to the mirror area 131 explained later of the cache memory B. In other words, the data stored in the local area 132 of the cache memory A and the data stored in the mirror area 131 of the cache memory B are subjected to mirroring.

For example, after notifying the host adapter A of the completion of writing of dirty data, the cache controller A transmits a copy of the dirty data to the cache controller B. The cache controller B stores the received copy of the dirty data in the mirror area 131 of the cache memory B. After storing the read data in the cache memory A, the cache controller A transmits a copy of the read data to the cache controller B. The cache controller B stores the received copy of the read data in the mirror area 131 of the cache memory B. Data transfer is performed in the same manner from the cache controller B to the cache controller A.

Data may be duplexed in the disk arrays 16 as well. For the duplexing of data, the disk adapter 14 is connected to the two disk arrays 16 via the two switches 15. In this case, for example, the disk adapter A receives a write command and one of dirty data and write data from the cache controller A, and transfers the write command and the dirty data or the write data to both the switches A and B. Consequently, the dirty data or the write data is written in both the disk arrays A and B. Therefore, for example, the write data of the cache memory A is stored in the disk arrays A and B and the data of cache memory B, which is a copy of the write data of the cache memory A, is stored in the disk arrays A and B. Therefore, the data is quadruplexed.

The two monitoring controllers 18 respectively monitor the power supply capacity of the plurality of battery units 19. For example, the monitoring controller 18 notifies the power supply capacity of the battery units 19 monitored by the monitoring controller 18, according to the request of the cache controller 12. The monitoring controller 18 controls, based on instructions from the cache controller 12, backup power supply by the battery units 19 to the cache memory 13, in other words, supply of electric power from the batteries.

The battery units 19 are batteries such as lead storage batteries. The plurality of battery units 19 are provided in the disk array apparatus 1. The battery units 19 are charged by a main power supply during normal time. When the main power supply is interrupted, for example, the battery units 19 supply electric power to both the two cache controller 12 and both the two cache memories 13 as a backup power supply. Backup power supplies for the host adapter 11, the disk adapter 14, the switch 15, the disk arrays 16, and the monitoring controller 18 are separately provided with the battery units 19.

Instead of the battery units 19, only one battery unit 19 may be provided. The battery units 19 do not have to be directly provided on the inside of the disk array apparatus 1. When the main power supply is interrupted, besides the cache memories 13, the battery units 19 may supply electric power to the host adapters 11, the cache controllers 12, the disk adapters 14, the switches 15, the disk arrays 16, and the monitoring controllers 18 from the backup power supplies.

Figure 2:
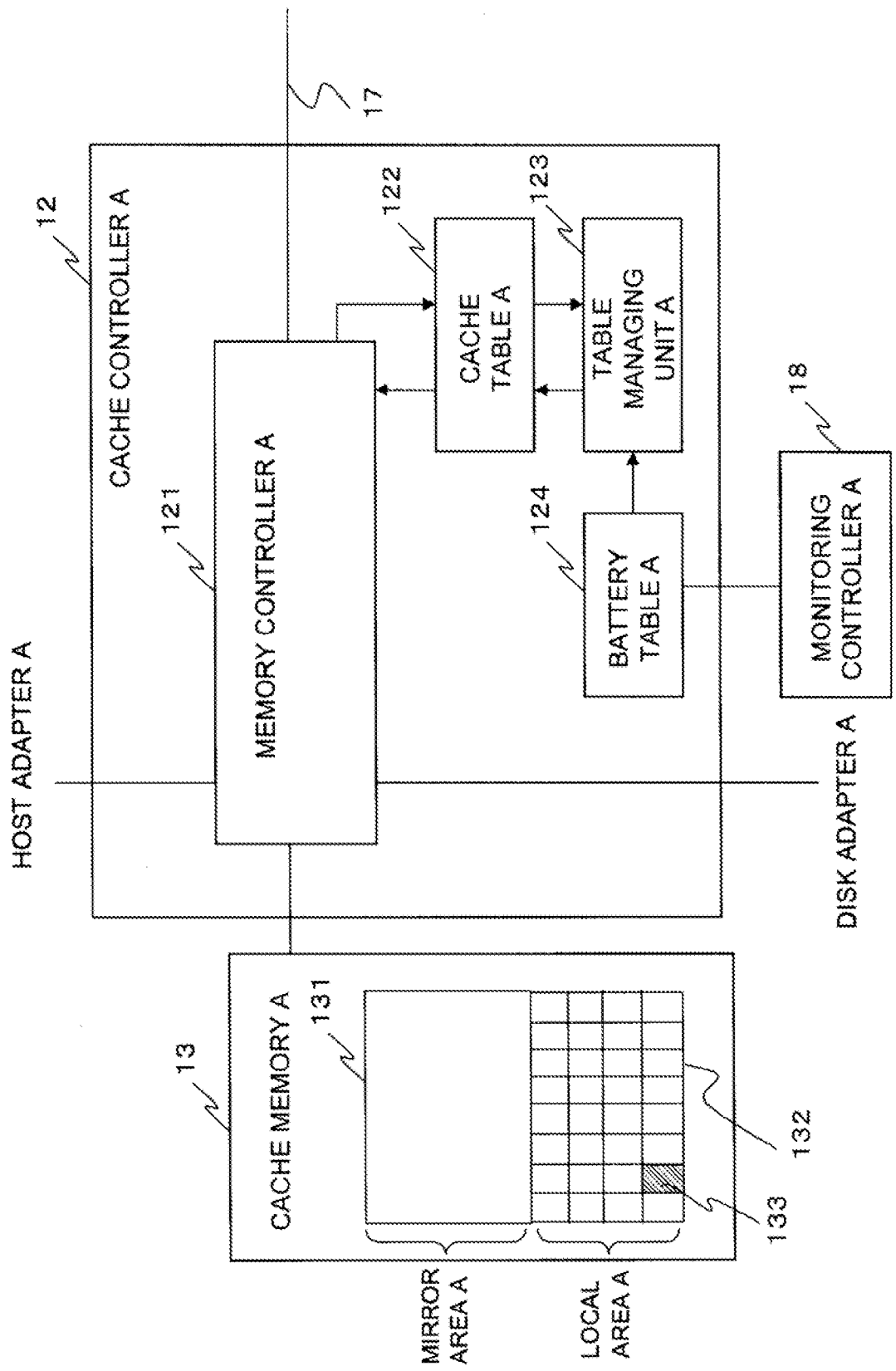
FIG. 2 is a diagram illustrating the configuration of a cache controller.

FIG. 2 is a diagram illustrating the configuration of the cache memory and the cache controller included in the disk apparatus illustrated in FIG. 1. FIG. 2 illustrates the cache memory A and the cache controller A. However, the cache memory B has the same configuration as the cache memory A. The cache controller B has the same configuration as the cache controller A.

The cache memory 13 includes the mirror area 131 and the local area 132. In the mirror area 131, a copy of data stored in the local area 132, in other words, data subjected to mirroring is stored. In the local area 132, the dirty data and the read data are stored. For example, data stored in a local area A of the cache memory A is copied to a mirror area of the cache memory B. Data stored in a mirror area A of the cache memory A is a copy of data stored in a local area of the cache memory B.

The cache controller 12A includes a memory controller 121, a cache table 122, a table managing unit 123, and a battery table 124.

The memory controller 121 controls the entire cache controller 12. Specifically, the memory controller 121 executes, as processing executed by the cache controller 12, the processing explained above, in other words, the communication with the host adapter 11, the control of the cache memory 13, the generation and the maintenance of state information, the communication with the disk adapter 14, and the communication with the other cache controller 12.

In the control of the cache memory 13, the memory controller 121 divides the cache memory 13A into two areas of the mirror area 131 and the local area 132, and manages the areas. In other words, a size of the mirror area 131 and a size of the local area 132 are equal. This is for the purpose of making it possible to copy all data of the local area 132 to the mirror area 131, as explained above. Further, the memory controller 121 finely divides the local area 132 into a plurality of memory banks 133, and manages the memory banks 133. In FIG. 2, for convenience of illustration, only one memory bank is hatched and denoted by reference numeral 133.

For example, when a memory capacity of the cache memory 13 is 32 GB (gigabytes), capacities of the mirror area 131 and the local area 132 are respectively set to 16 GB. The local area 132 having the capacity of 16 GB is divided into, for example, thirty-two memory banks 133. In this case, the size of one memory bank 133 is 512 MB (megabytes).

The memory controller 121 allocates a memory bank No. (a memory bank number) to each of the memory banks 133. The memory bank No. is an identification number uniquely set for each of the memory banks 133. For example, as illustrated in FIG. 3B, memory bank Nos. #1 to #32 are given to the thirty-two memory banks 133.

Unlike the local area 132, the mirror area 131 is not fragmented into memory banks. In the mirror area 131, copies of data stored in the local area 132 are stored in order from the top, for example.

The memory controller 121 controls the cache memory 13 using the memory bank No. To control the cache memory 13, the memory controller 121 refers to the cache table 122. The cache table 122 is prepared by the memory controller 121 at a start time of the disk array apparatus 1, and is updated by the table managing unit 123. The table managing unit 123 may receive notification of the memory bank No. from the memory controller 121 and prepare the cache table 122. The memory controller 121 may receive notification of power supply capacity information indicating the power supply capacity of the batteries from the table managing unit 123, and update the cache table 122.

The table managing unit 123 refers to the battery table 124 to update the cache table 122. The battery table 124 is prepared by the table managing unit 123 at the start time of the disk array apparatus 1, and is updated by the monitoring controller 18. The number of the battery units 19 is predetermined in the table managing unit 123. The table managing unit 123 may receive notification of power supply capacity information from the monitoring controller 18, and update the battery table 124.

FIG. 3A illustrates an example of the battery table 124.

The battery table 124 includes power supply capacity information for each of the battery units 19. The battery supply ability information includes a charge amount X (%) and a deterioration coefficient Y, for example. The charge amount X (%) indicates a degree of charging of the battery units 19. The deterioration coefficient Y indicates a degree of aged deterioration of the batteries.

The charge amount X is represented by % with a state in which the battery units 19 are completely charged set to "100%", and a state in which the battery units 19 are not charged at all set to "0%". The monitoring controller 18 measures an output voltage of the battery units 19, calculates the charge amount X based on the output voltage, and updates the charge amount X of the battery table 124, for each of the battery units 19. The monitoring controller 18 includes means for measuring the output voltage of the battery units 19.

The deterioration coefficient Y is represented with a state in which the battery units 19 are not deteriorated at all set to "1", and a state in which the battery units 19 are completely deteriorated set to "0". The deterioration coefficient Y is determined based on the date of manufacturing the battery units 19, for example. The monitoring controller 18 compares the manufacturing date of the battery units 19 and the present date to calculate an elapsed period from the manufacturing date, calculates the deterioration coefficient Y based on the elapsed period, and updates the deterioration coefficient Y of the battery table 124. For example, the manufacturing date is input to and stored in the monitoring controller 18 by an operator when the disk array apparatus 1 is shipped. The present date is, for example, a value of a CPU timer of a CPU included in the cache controller 12 and is given from the cache controller 12. A conversion table for converting the elapsed period into the deterioration coefficient Y is predetermined and given to the monitoring controller 18.

Figure 5:
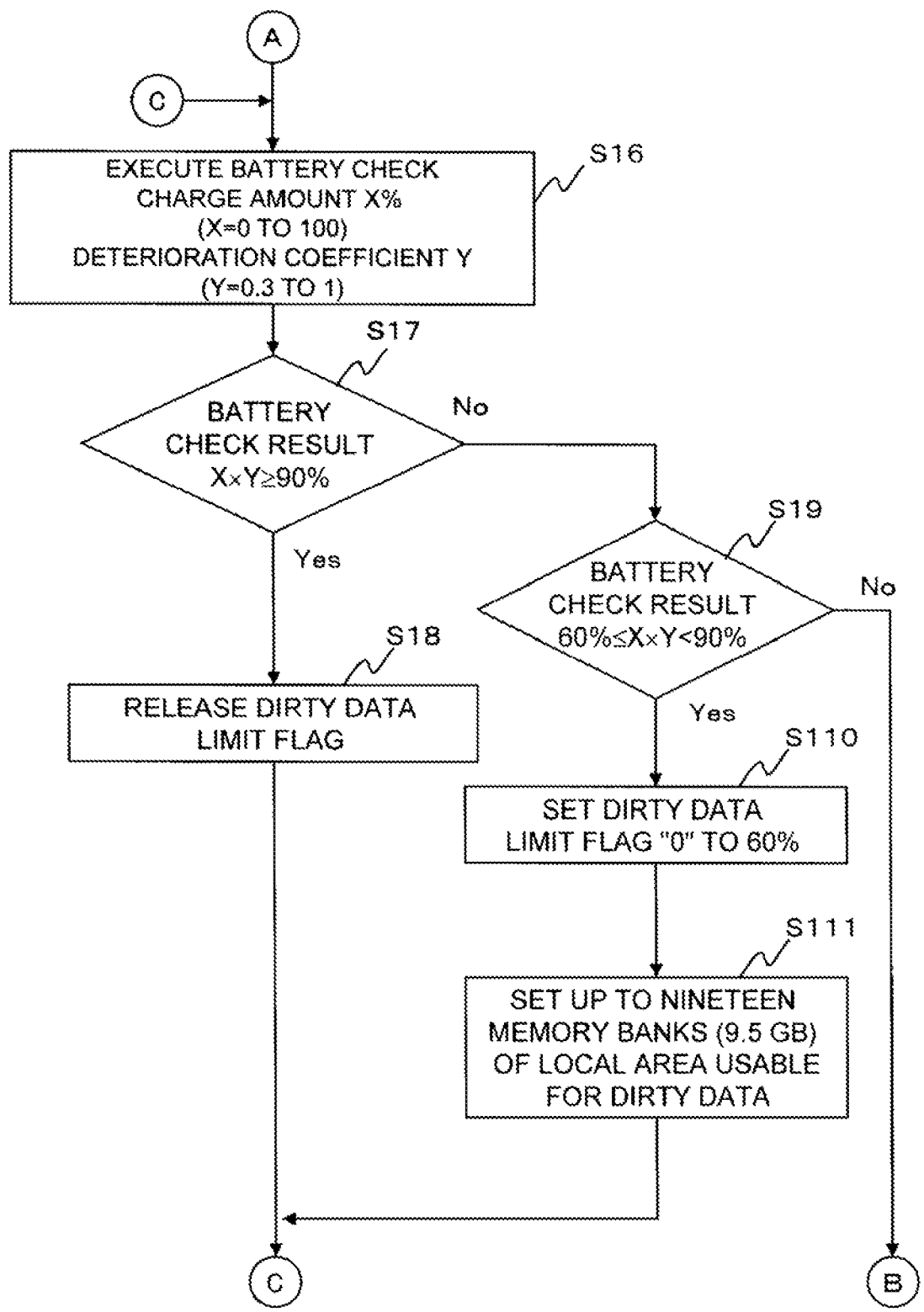

Actually, as a value of the deterioration coefficient Y, a value of "1" to "0.3" is used as illustrated in FIG. 5, which is referred to later. When a long period elapses from the manufacturing date of the battery units 19, in some case, the value of the deterioration coefficient Y decreases to, for example, "0.2". In this case, even when a value of the charge amount X is large, the power supply capacity of the battery units 19 set based on an average of X×Y decreases. Therefore, a value equal to or smaller than "0.2" is not used as the value of the deterioration coefficient Y. The value "0.3" of the deterioration coefficient Y can be considered to correspond to, for example, a replacement time of the battery units 19.

The update of the charge amount X and the deterioration coefficient Y is periodically executed at an update period, which is predetermined. The update period is set to, for example, several minutes to cope with a sudden change in the charge amount X. The update period may be, for example, several seconds, several tens minutes, or several hours. Since a change in the deterioration coefficient Y can be learned and predetermined, the deterioration coefficient Y may be updated at a period longer than the update period, for example, several days, several weeks, or several months. The deterioration coefficient Y may be determined based on temperature or humidity around the battery units 19, the number of times of discharge of the battery units 19, or the like. The temperature around the battery units 19 is measured by a temperature sensor included in the monitoring controller 18 and stored in the monitoring controller 18. The humidity around the battery units 19 is measured by a humidity sensor included in the monitoring controller 18 and stored in the monitoring controller 18. The number of times of discharge is counted by and stored in the monitoring controller 18 every time discharge occurs.

The table managing unit 123 acquires power supply capacity information at the update period, which is explained above. Specifically, the table managing unit 123 refers to the battery table 124 to execute battery check. Specifically, the table managing unit 123 calculates, for each of the battery units 19, X×Y concerning the charge amount X % and the deterioration coefficient Y and further calculates an average of values X×Y concerning the plurality of battery units 19. This average is power supply capacity information, which indicates the power supply capacity of the battery units 19. Since the battery check is periodically executed, for example, at the update period explained above, it is possible to cope with a sudden change in the power supply capacity of the battery units 19.

The table managing unit 123 updates the cache table 122 based on the power supply information, which is a result of the battery check and, following the update, limits writing of dirty data for each of the memory banks 133 in the local area 132 of the cache memory 13. The update of the cache table 122 is periodically executed, for example, at the update period explained above. This makes it possible to, coping with a sudden change in the power supply capacity of the battery units 19, limit writing of dirty data and prevent write data from being lost. The update of the cache table 122 may be executed at a period other than the update period. The update of the cache table 122 and the limitation of the writing of the dirty data may be executed at different periods.

FIG. 3B illustrates an example of the cache table 122.

The cache table 122 includes information of a dirty data limit flag and a dirty data amount (MB: megabyte) for each of the memory banks 133, in other words, for each of the memory bank Nos.

The dirty data limit flag is identification information which indicates, for each of the plurality of memory banks 133, whether the memory bank 133 is a permitted area in which a writing of dirty data is permitted or an inhibited area in which the writing of dirty data is inhibited. For example, as illustrated in FIG. 3B, "1" is set as the dirty data limit flag in the memory bank #32 in which the writing of dirty data is inhibited. "0" is set as the dirty data limit flag in the memory banks #1 and #2 in which the writing of dirty data is permitted.

The memory bank 133 having the dirty data limit flag "1" is an inhibited area in which the writing of dirty data in the memory bank 133 is inhibited. Therefore, the memory controller 121 writes, based on the cache table 122, only the read data, which is read out from the disk arrays 16, in the memory bank 133 having the dirty data limit flag "1". Consequently, in the memory bank 133 having the dirty data limit flag "1", the dirty data does not exist and only the read data exists.

The memory bank 133 having the dirty data limit flag "0" is a permitted area in which the writing of dirty data is permitted. Therefore, the memory controller 121 writes, based on the cache table 122, the read data and the dirty data in the memory bank 133 having the dirty data limit flag "0". Consequently, it is likely that, besides the read data, the dirty data exists in the memory bank 133 having the dirty data limit flag "0".

Accordingly, a dirty data amount stored in the local area 132 is, at the maximum, equal to total size S of the memory banks 133 having the dirty data limit flags "0". A dirty data amount stored in one cache memory 13 is, at the maximum, size 2S twice as large as the size S when a copy of data of the local area 132 of the other cache memory 13 present in the mirror area 131 is taken into account. An amount of the dirty data stored in the two cache memories 13 is size 4S, which is four times as large as the size S, at the maximum.

Therefore, when the main power supply is interrupted, it is sufficient when data having the size 4S can be transferred to the disk arrays 16 in a period in which electric power is supplied from the backup power supply by discharge from the battery units 19. In other words, when the data having the size 4S can be transferred to the disk arrays 16, it is possible to back up all dirty data, in other words, guarantee saving of all the dirty data. On the other hand, time of data transfer from the cache memory 13 to the disk arrays 16 can be empirically known. Time in which discharge at an effective level from the battery units 19 continues can also be learned based on the power supply capacity of the battery units 19 at that point.

Therefore, the number of dirty data limit flags "1" is set on the power supply capacity of the battery units 19 at that point, whereby the data having the size 4S is equal to or smaller than data size that can be transferred to the disk arrays 16. In other words, the memory controller 121 sets the number of permitted areas and, therefore, the number of inhibited areas in the cache table 122, whereby the number is set according to the power supply capacity of the battery units 19.

Since the total capacity of the cache memory 13 is constant, when the number of permitted areas is set, the number of inhibited areas is resultantly also set. Therefore, the determining the size of the permitted area and the size of the inhibited areas includes setting the size of one of the permitted areas and the inhibited areas, whereby the size of the other of the permitted areas and the inhibited areas is resultantly set.

The dirty data limit flags "1" are set in order from the memory bank No. #32, for example, in a descending order of the memory bank Nos. of the memory banks 133. The dirty data limit flags "1" may be set in an ascending order of the memory bank Nos. or may be set at random irrespective of the memory bank Nos.

With regard to the two cache memories 13, the numbers of the dirty data limit flags "1" are equal. The memory bank Nos. of the memory banks 133 in which the dirty data limit flags "1" are set are also equal. This makes it possible to prevent processing for guaranteeing saving of dirty data from becoming complicated. For example, when one of the two memory controllers 121 changes the number of the dirty data limit flags "1" and the memory banks 133 to be set, results of the change are transmitted to the other memory controller 121 via the cache-to-cache signal line 17. According to these results, the other memory controller 121 changes the number of the dirty data limit flags "1" and the memory banks 133 to be set.

A dirty data amount indicates an amount of dirty data written in the memory banks 133. For example, when dirty data having size of 512 MB is written in the memory bank #1, as illustrated in FIG. 3B, a dirty data amount of the memory bank #1 is updated to "512 (MB)".

In the cache table 122, even when the memory bank 133 has the dirty data limit flag "1", in some case, a dirty data amount of the memory bank 133 is not "0". Since dirty data is stored in the memory bank 133 exceeding a limit for inhibiting writing, such a memory bank 133 is referred to as "memory bank 133 exceeding a dirty data limit value". The number of the memory banks 133 having the dirty data limit flags "0" is referred to as "dirty data limit value".

In the memory bank 133 having the dirty data limit flag "0", when a dirty data amount of the memory bank 133 is not "0", actually, the number of the memory bank 133 does not exceed the dirty data limit value. Therefore, it can be said that the memory bank 133 exceeding the dirty data limit value is the memory bank 133 that has a possibility to exceed the dirty data limit value.

The memory bank 133 exceeding the dirty data limit value occurs when the dirty data limit flag is set to "1" after dirty data is written in the memory bank 133 having the dirty data limit flag "0". The memory controller 121 refers to the cache table 122, and, when the memory bank 133 exceeding the dirty data limit value exists in the cache table 122, transfers the dirty data of the memory bank 133 exceeding the dirty data limit value to the disk arrays 16.

For example, first, the table managing unit 123 changes the dirty data limit flag from "0" to "1". Then, the memory controller 121 transfers the dirty data of the memory bank 133, the dirty data limit flag of which is changed from "0" to "1", to the disk arrays 16 via the disk adapter 14 and the switch 15, and writes (saves) the dirty data in the disk arrays 16. At a point when access to the disk arrays 16 is enabled, this writing is executed more preferentially than dirty data stored in the other memory banks 133, in other words, dirty data of the memory banks having the dirty data limit flags "0". Consequently, it is possible to reduce possibility that dirty data is lost. It is possible to prevent dirty data from being further written in the memory bank 133, the dirty data limit flag of which would be changed from "0" to "1".

Every time power supply capacity information, which is a result of the battery check, is acquired, the table managing unit 123 sets, according to the power supply capacity information, the dirty data limit flag for each of the memory banks 133 in the cache table 122. In other words, the table managing unit 123 sets, according to the power supply capacity information, with the memory bank 133 set as a unit, an inhibited area in which the writing of dirty data is inhibited and a permitted area in which the writing of dirty data is permitted. Consequently, a ratio of inhibited areas and permitted areas in the local area 132 of the cache memory 13 is set. The size of the inhibited area, the size of the permitted area, and the ratio of inhibited areas and permitted areas can be set empirically and are predetermined according to power supply capacity.

As explained above, since the mirror area 131 is not fragmented into memory banks, a ratio of inhibited areas and permitted areas is not set in the mirror area 131.

For example, the table managing unit 123 sets the dirty data limit flags, whereby the ratio of inhibited areas and permitted areas is equal to a ratio which is predetermined according to power supply capacity. In other words, the number of the memory banks 133 having the dirty data limit flags "1" (therefore, the size of the inhibited area) and the number of the memory banks 133 having the dirty data limit flags "0" (therefore, the size of the permitted area) are set according to the power supply capacity.

When the memory controller 121 writes write data, in other words, dirty data in the cache memory 13, the memory controller 121 refers to the cache table 122. The memory controller 121 writes the dirty data in the memory banks 133 having the dirty data limit flag "0" and adds an amount of the written dirty data to a value of a dirty data amount of memory bank Nos. of the memory banks 133. Consequently, the memory controller 121 manages the written dirty data amount for each of the memory banks 133.

When the main power supply is interrupted, the memory controller 121 controls the battery units 19 to supply electric power to the cache controller 12 itself and the cache memory 13 from the battery units 19. Consequently, the memory controller 121 transfers the dirty data stored in the memory bank 133 having the dirty data limit flag "0" to the disk arrays 16.

Actually, for transfer of the dirty data, the memory controller 121 needs to know an address where the dirty data is stored in the cache memory 13. Therefore, the memory controller 121 includes a cache memory management table separately from the cache table 122 and stores, for each dirty data, an address where the dirty data is written in the cache memory 13. The dirty data is stored in a writing area for dirty data, which is predetermined in a system area which is an area used by the cache controller 12, in the disk arrays 16. The read data is stored in a writing area for read data, which is predetermined in the system area which is the area used by the cache controller 12, in the disk arrays 16. The cache table 122 and the cache memory management table may be integrally provided.

Figure 4:
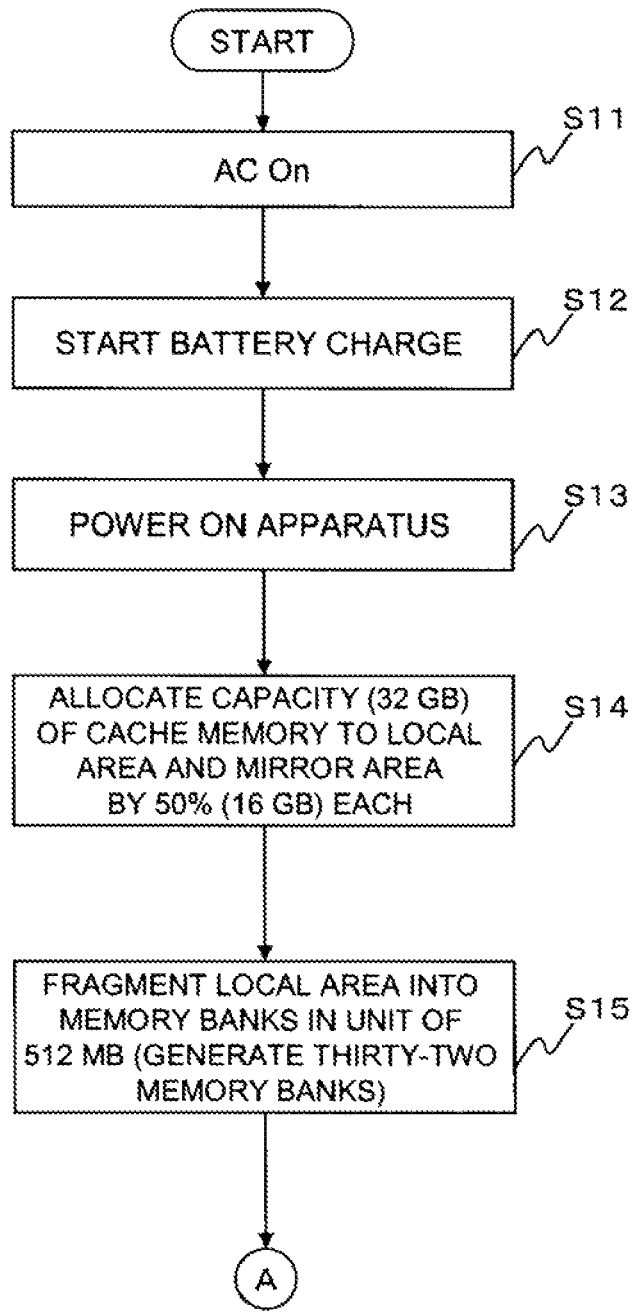
FIGS. 4 to 7 are a flowchart illustrating a cache control processing flow.
Figure 6:
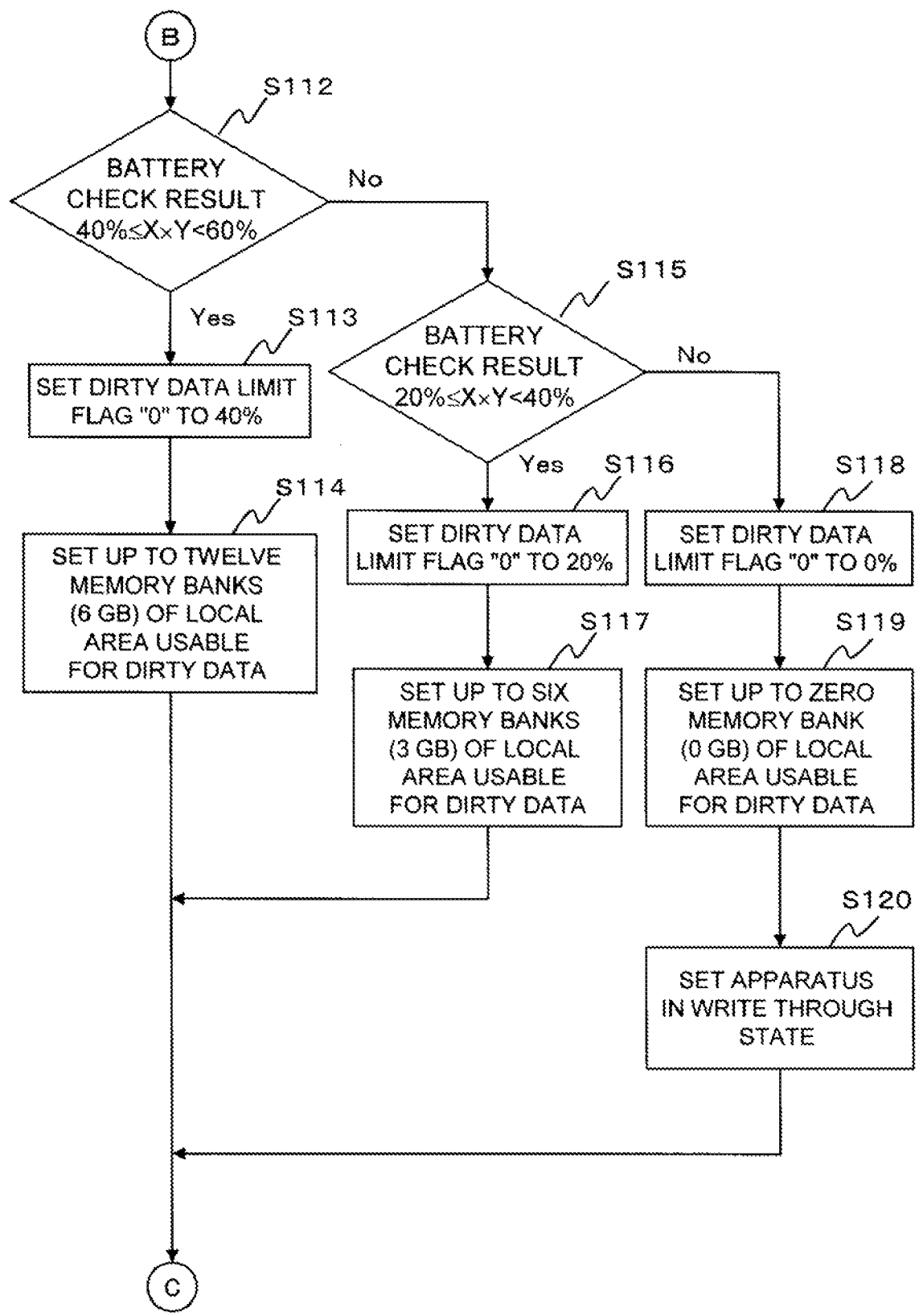

FIGS. 4 to 6 are flowcharts united to show a cache control processing flow. FIGS. 4 to 6 show cache control processing at the start time of the disk array apparatus 1 illustrated in FIG. 1.

When the main power supply of the disk array apparatus 1, for example, an AC (alternating current) power supply is turned on, AC power is supplied from the main power supply to the disk array apparatus 1 (AC On) (step S11). According to the supply of the AC power, charging of the battery units 19 is started via an internal power supply device of the disk array apparatus 1 (step S12).

On the other hand, when the main power supply of the disk array apparatus 1 is turned on, the disk array apparatus 1 changes to a power-on on (Power On) state (step S13). Accordingly, the disk array apparatus 1 is started and executes initialization processing. In the initialization processing, for example, the memory controller 121 recognizes a memory capacity (e.g., 32 GB) of the cache memory 13, generates the cache table 122 and the battery table 124, and changes the state information to the "write-back state". Usually, since the battery units 19 are charged to nearly 100%, the state information is changed to the "write-back state". When the battery units 19 that are not charged at all or hardly charged are used, in the initialization processing, the state information only has to be changed to the "write-through state".

After the initialization processing, the memory controller 121 allocates the memory capacity of the cache memory 13 to the local area 132 and the mirror area 131 by 50% (e.g., 16 GB) each (step S14). Further, the memory controller 121 fractions the local area 132 of the cache memory 13 into the plurality of memory banks 133 (e.g., 512 MB) (step S15). In other words, the cache controller 12 divides the local area 132 into thirty-two memory banks 133, and gives the memory bank Nos. #1 to #32 to the thirty-two memory banks 133. The cache controller 12 stores the memory bank Nos. in the cache table 122.

Steps S11 to S15 explained above are processing executed at the start time of the disk array apparatus 1. On the other hand, steps S16 to S120, which are explained below, are processing repeatedly executed during operation of the disk array apparatus 1 after the start.

The monitoring controller 18 executes battery check for each of the battery units 19, calculates the charge amount X % and the deterioration coefficient Y, and stores the calculated charge amount X % and deterioration coefficient Y in the battery table 124 as power supply capacity information (step S16). Step S16 is repeatedly executed, for example, at an interval of several minutes that is the update period explained above.

The table managing unit 123 of the cache controller 12 refers to the battery table 124 to calculate X×Y for charge amounts X % and deterioration coefficients Y concerning the plurality of battery units 19, and further calculates an average of X×Y. The table managing unit 123 uses the average as power supply capacity information indicating the power supply capacity of the battery units 19. In the following explanation referring to FIGS. 5 and 6, the "power supply capacity information" is referred to as "battery check result X×Y".

The table managing unit 123 determines whether the battery check result X×Y is equal to or larger than 90% (step S17). When the battery check result X×Y is equal to or larger than 90% (Yes, step S17), the table managing unit 123 releases all the dirty data limit flags, in other words, the dirty data limit flags of the thirty-two memory banks #1 to #32, in other words, sets the dirty data limit flags to "0" (step S18). In other words, when a value of the battery check result X×Y is larger than the maximum threshold 90% in a plurality of thresholds 20% to 90%, the thirty-two (e.g., 16 GB) memory banks 133 are set as permitted areas in which the writing of dirty data is permitted.

The monitoring controller 18 may execute step S17. Similarly, the monitoring controller 18 may execute steps S19, S112, and S115, which are explained later.

Accordingly, the memory controller 121 can write dirty data in all the memory banks 133, in other words, the thirty-two memory banks 133 in the write-back state. The memory controller 121 can write read data in the thirty-two memory banks 133. In this case, since the X×Y is equal to or larger than 90%, in other words, the power supply capacity of the battery units 19 is sufficiently large, when the main power supply is interrupted, data stored in the thirty-two memory banks 133 can be saved in the disk arrays 16 within a supply period of electric power from the backup power supply by the battery units 19. Then, the disk array apparatus 1 is operated in this state and step S16 is executed. Therefore, the state information is not changed.

When the battery check result X×Y is not equal to or lager than 90% (No, step S17), the table managing unit 123 further determines whether the battery check result X×Y is equal to or lager than 60% (step S19). When the battery check result X×Y is equal to or lager than 60% (Yes, step S19), the table managing unit 123 determines to set the dirty data limit flags to "0" concerning, for example, 60% of the memory banks #1 to #32 (step S110), sets the dirty data limit flags of the nineteen memory banks 133 among the memory banks #1 to #32 to "0", and sets the dirty data limit flags of the other thirteen memory banks 133 to "1" (step S111). In other words, the nineteen (e.g., 9.5 GB) memory banks 133 are set as the permitted areas in which the writing of the dirty data is permitted.

In step S111, the memory controller 121 refers to the cache table 122 to determines whether the memory bank 133 having the dirty data limit flag of "1" and not having the dirty data amount of "0" exists, in other words, the memory bank 133 exceeding the dirty data limit value exists. When the memory bank 133 exceeding the dirty data limit value exists, the memory controller 121 writes, after the execution of step S111, dirty data of the memory bank 133 exceeding the dirty data limit value in the disk arrays 16.

Accordingly, the memory controller 121 can write dirty data in the nineteen memory banks 133 in the write-back state regardless of the fact that the power supply capacity of the battery units 19 falls. Read data can be written in the thirty-two memory banks 133. In this case, when the main power supply is interrupted, data stored in the nineteen memory banks 133 can be saved within the supply period of electric power from the backup power supply by the battery units 19. In other words, it is possible to maintain the operation in the write-back state by limiting backup targets of the battery units 19 to the nineteen memory banks 133. Then, the disk array apparatus 1 is operated in this state and step S16 is executed. Therefore, the state information is not changed.

When the battery check result X×Y is not equal to or lager than 60% (No, step S19), the table managing unit 123 further determines whether the battery check result X×Y is equal to or lager than 40% (step S112). When the battery check result X×Y is equal to or lager than 40% (Yes, step S112), the table managing unit 123 determines to set the dirty data limit flags to "0" concerning, for example, 40% of the memory banks #1 to #32 (step S113), sets the dirty data limit flags of the twelve memory banks 133 among the memory banks #1 to #32 to "0", and sets the dirty data limit flags of the other twenty memory banks 133 to "1" (step S114). In other words, the twelve (e.g., 6 GB) memory banks 133 are set as the permitted areas in which the writing of dirty data is permitted.

In step S114, the memory controller 121 refers to the cache table 122 to determines whether the memory bank 133 having the dirty data limit flag of "1" and not having the dirty data amount of "0" exists, in other words, the memory bank 133 exceeding the dirty data limit value exists. When the memory bank 133 exceeding the dirty data limit value exists, the memory controller 121 writes, after the execution of step S114, dirty data of the memory bank 133 exceeding the dirty data limit value in the disk arrays 16.

Accordingly, the memory controller 121 can write dirty data in the twelve memory banks 133 in the write-back state regardless of the fact that the power supply capacity of the battery units 19 falls. Read data can be written in the thirty-two memory banks 133. In this case, when the main power supply is interrupted, data stored in the twelve memory banks 133 can be saved within the supply period of electric power from the backup power supply by the battery units 19. In other words, it is possible to maintain the operation in the write-back state for a longer period by limiting backup targets of the battery units 19 to the twelve memory banks 133 using the dirty data limit flags. Then, the disk array apparatus 1 is operated in this state and step S16 is executed. Therefore, the state information is not changed.

In this case, all the data of the twelve memory banks 133 as the backup targets are saved. Therefore, in the twelve memory banks 133 as the backup targets, it is unnecessary to execute determination processing for determining whether written data is dirty data or read data.

When the battery check result X×Y is not equal to or lager than 40% (No, step S112), the table managing unit 123 further determines whether the battery check result X×Y is equal to or lager than 20% (step S115). When the battery check result X×Y is equal to or larger than 20% (Yes, step S115), the table managing unit 123 determines to set the dirty data limit flags to "0" concerning, for example, 20% of the memory banks #1 to #32 (step S116), sets the dirty data limit flags of the six memory banks 133 among the memory banks #1 to #32 to "0", and sets the dirty data limit flags of the other twenty-six memory banks 133 to "1" (step S117). In other words, when the battery check result X×Y is larger than the minimum threshold 20% in the plurality of thresholds 90% to 20%, the six (e.g., 3 GB) memory banks 133 are set as the permitted areas in which the writing of the dirty data is permitted. Consequently, when the battery check result X×Y is larger than the minimum threshold 20% in the plurality of thresholds 90% to 20%, the memory controller 121 can operate in the write-back state.

In step S117, the memory controller 121 refers to the cache table 122 to determines whether the memory bank 133 having the dirty data limit flag of "1" and not having the dirty data amount of "0" exists, in other words, the memory bank 133 exceeding the dirty data limit value exists. When the memory bank 133 exceeding the dirty data limit value exists, the memory controller 121 writes, after the execution of step S117, dirty data of the memory bank 133 exceeding the dirty data limit value in the disk arrays 16.

Accordingly, the memory controller 121 can write dirty data in the six memory banks 133 in the write-back state regardless of the fact that the power supply capacity of the battery units 19 falls. Read data can be written in the thirty-two memory banks 133. In this case, when the main power supply is interrupted, data stored in the six memory banks 133 can be saved within the supply period of electric power from the backup power supply by the battery units 19. In other words, it is possible to maintain the operation in the write-back state for a longer period by limiting backup targets of the battery units 19 to the six memory banks 133. Then, the disk array apparatus 1 is operated in this state and step S16 is executed. Therefore, the state information is not changed.

On the other hand, for example, at a point when the battery units 19 that are not charged at all are charged and the battery check result X×Y reaches 20% or higher percentage, the memory controller 121 can immediately shift from the present write-through state to the write-back state. This makes it possible to further extend the period in which the disk array apparatus 1 operates in the write-back state.

When the battery check result X×Y is not equal to or lager than 20% (No, step S115), in other words, when the battery check result X×Y is smaller than 20%, the table managing unit 123 determines to set the dirty data limit flags to "0" concerning, for example, all the memory banks 133 (step S118) and sets the dirty data limit flags of the thirty-two memory banks 133 to "1" (step S119). In other words, when the battery check result X×Y is smaller than the minimum threshold 20% in the plurality of thresholds 90% to 20%, the memory bank 133 set as the permitted area in which the writing of dirty data is permitted does not exist. Consequently, when the battery check result X×Y is smaller than the minimum threshold 20% in the plurality of thresholds 90% to 20%, the memory controller 121 operates in the write-through state.

In step S119, the memory controller 121 refers to the cache table 122 to determines whether the memory bank 133 having the dirty data limit flag of "1" and not having the dirty data amount of "0" exists, in other words, the memory bank 133 exceeding the dirty data limit value exists. When the memory bank 133 exceeding the dirty data limit value exists, the memory controller 121 writes, after the execution of step S119, dirty data of the memory bank 133 exceeding the dirty data limit value in the disk arrays 16.

Accordingly, the memory controller 121 shifts from the present write-back state to the write-through state for the first time at this point (step S120). Specifically, the memory controller 121 changes the state information of the memory controller 121 from the "write-back state" to the "write-through state", and notifies the other memory controller 121 of the change of the state information via the cache-to-cache signal line 17. Then, the disk array apparatus 1 is operated in this state and step S16 is executed. As a result, the memory controller 121 once writes write data in the cache memory 13, then, reads out the write data written in the cache memory 13, and writes the write data in the disk arrays 16, and, then, notifies the host adapter 11, which is a transfer source of a write request, of the completion of the writing.

The memory controller 121 may determine, based on the battery check results X×Y of values other than 60%, 40%, and 20%, the number of the memory banks 133 having the dirty data limit flags "0", in other words, the number of the memory banks 133 that are permitted areas for dirty data. The values of the battery check results X×Y used for determining the number of the memory banks 133 are not limited to three stages. In other words, the number of the memory banks 133 having the dirty data limit flags "0" may be dynamically changed in more stages other than being dynamically changed in the three stages. It is possible to variously change the dirty data limit flags of how many memory banks 133 are set to "0" when the battery check result X×Y is how many %.

Second Embodiment

In the disk array apparatus 1 illustrated in FIG. 1, it is necessary to transfer the dirty data of the memory bank 133 in which a dirty data amount is likely to exceed the dirty data limit value, in other words, the memory bank 133 whose dirty data limit flag is changed from "0" to "1", to the disk arrays 16. In this case, when the main power supply is interrupted before the dirty data is transferred to the disk arrays 16, a part of the dirty data is lost. Therefore, saving of the dirty data cannot be guaranteed. Therefore, as illustrated in FIG. 7, saving of dirty data of the memory bank 133 exceeding the dirty data limit value is guaranteed concerning a period until the dirty data is transferred to the disk arrays 16.

Figure 7:
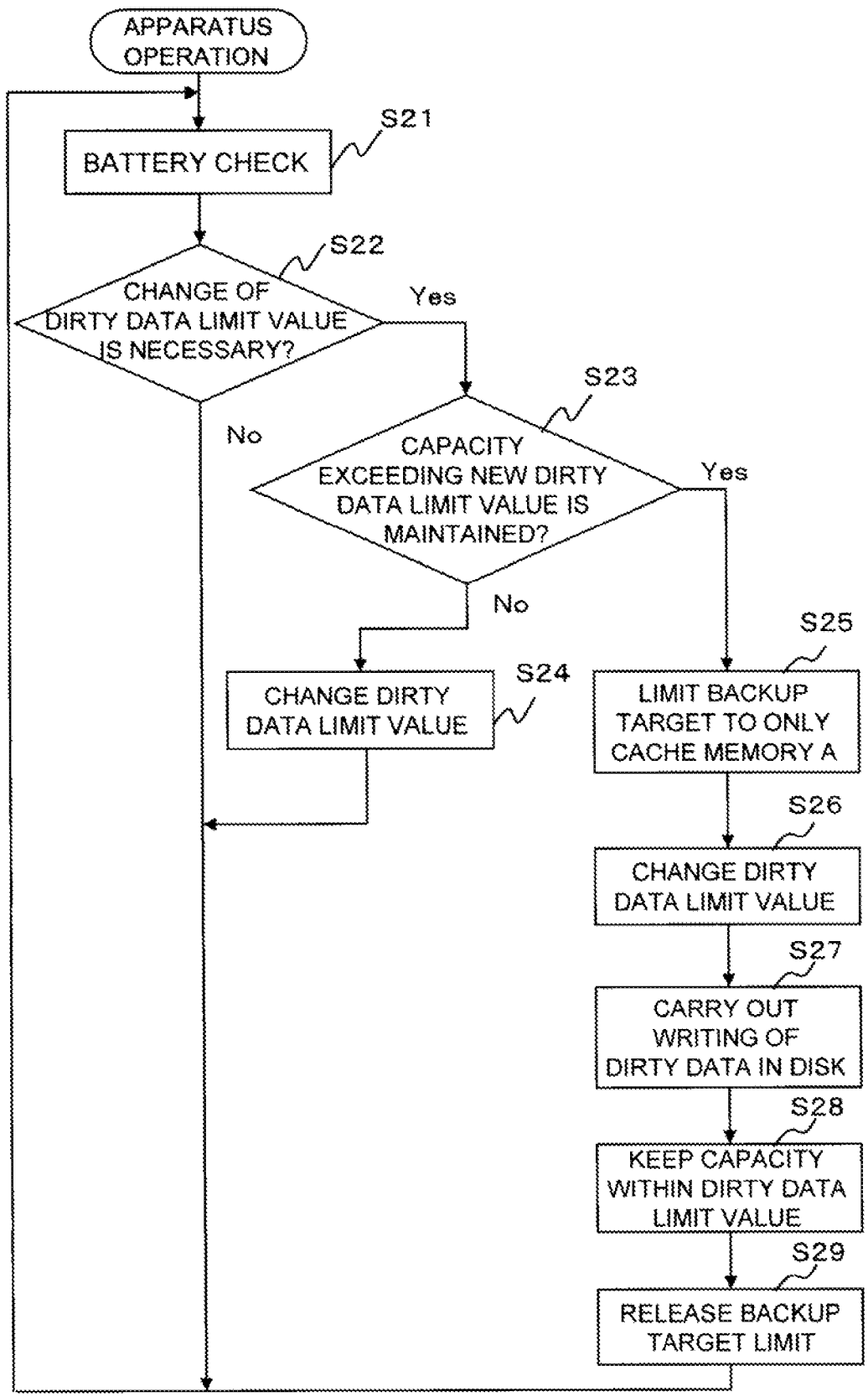

FIG. 7 is a diagram illustrating another kind of cache control processing flow. Another kind of cache control processing during the operation of the disk array apparatus 1 is illustrated.

The monitoring controller 18 and the table managing unit 123 execute the battery check in step S16 illustrated in FIG. 5 during the operation of the disk array apparatus 1 at the update period explained above (step S21). After step S16, when steps S18, S111, S114, S117, and S119 are executed, the memory controller 121 executes steps S22 to S29 explained below in addition to the processing in steps S18, S111, S114, S117, and S119. Step S26 is equivalent to steps S18, S111, S114, S117, and S119.

The memory controller 121 determines whether it is necessary to change the dirty data limit value, in other words, the number of the memory banks 133 having the dirty data limit flags "0" (step S22). Therefore, the memory controller 121 calculates the present dirty data limit value referring to the cache table 122. Then, the memory controller 121 compares the present dirty data limit value and a new dirty data limit value determined by processing in S17, S110, S113, S116, and S118. When it is unnecessary to change the dirty data limit value (No, step S22), the memory controller 121 repeats step S21.

When it is necessary to change the dirty data limit value (Yes, step S22), the memory controller 121 further determines whether the cache memory 13 stores an amount of dirty data having a capacity exceeding the new dirty data limit value (step S23). In other words, the memory controller 121 determines the memory bank 133, the dirty data limit flag of which needs to be changed from "0" to "1", and determines whether the determined memory bank 133 stores dirty data. When the determined memory bank 133 stores the dirty data, it means that the cache memory 13 stores the amount of the dirty data having the capacity exceeding the new dirty data limit value.

When the cache memory 13 does not store the amount of the dirty data having the capacity exceeding the new dirty data limit value (No, step S23), the memory controller 121 changes the dirty data limit value (step S24) and repeats step S21.

When the cache memory 13 stores the amount of the dirty data having the capacity exceeding the new dirty data limit value (Yes, step S23), the memory controller 121 limits a supply targets of electric power from the backup power supply by the battery units 19 to only one of the two cache memories 13, for example, the cache memory A (step S25). Consequently, when the memory bank 133 changed from the permitted area to the inhibited area stores dirty data, only the cache memory A is set as a supply targets of electric power from the backup power supply by the batteries until the dirty data stored in the memory bank 133 changed from the permitted area to the inhibited area is written in the disk arrays 16. The supply targets of electric power from the backup power supply may be the cache memory B.

Consequently, when the main power supply is interrupted, the battery units 19 supply electric power from the backup power supply to only the cache memory A and does not supply the electric power to the cache memory B. Therefore, only dirty data stored in the cache memory A is written in the disk arrays 16. However, dirty data stored in the local area 132 of the cache memory B is copied to the mirror area A of the cache memory A. Therefore, even when backup of the cache memory B is temporarily stopped, the dirty data of the cache memory B is not lost.

Accordingly, it is sufficient that, when the main power supply is interrupted, dirty data having the total size 2S in the one cache memory A can be transferred to the disk arrays 16 in a period in which the electric power from the backup power supply is supplied according to discharge from the battery units 19. In other words, for example, the one cache controller A and the one cache memory A only have to be energized. Therefore, it is possible to suppress power consumption during electric power failure processing. Consequently, concerning the memory bank 133 exceeding the dirty data limit value, it is also possible to guarantee saving of dirty data.

After step S25, the memory controller 121 changes the dirty data limit value (step S26). Specifically, the memory controller 121 changes the dirty data limit flag from "0" to "1" in the cache table 122.

Then, the memory controller 121 writes the dirty data stored in the memory bank 133, which belongs to the cache memory A and whose dirty data limit flag of which is changed from "0" to "1", in the disk arrays 16 (step S27). When the dirty data stored in the memory bank 133, the dirty data limit flag of which is changed from "0" to "1", does not exist as a result of this processing, the memory controller 121 changes the cache memory A to a state in which the amount of the ditty data having the capacity exceeding the new dirty data limit value is not stored (step S28).

Then, the memory controller 121 releases the limitation of the supply targets of electric power from the backup power supply by the battery units 19 set in step S25 (step S29). In other words, the memory controller 121 sets the cache memory B, which is excluded from the supply targets of electric power from the backup power supply, as a supply targets of electric power from the backup power supply again.

Third Embodiment

In the cache control processing illustrated in FIG. 7, instead of the processing in step S25, the memory controller 121 may limit the supply targets of electric power from the backup power supply by the battery units 19 to only the local areas 132 in the two cache memories 13. In other words, when dirty data is stored in the memory bank 133 changed from the permitted area to the inhibited area, only the local area A of the cache memory A and the local area of the cache memory B are set as supply targets of electric power from the backup power supply by the battery units 19.

Consequently, when the main power supply is interrupted, the battery units 19 supply the electric power from the backup power supply only to the local areas 132 of the two cache memories 13 and do not supply the electric power to the mirror areas 131. Consequently, only dirty data stored in the local areas 132 of the two cache memories 13 is written in the disk arrays 16. Therefore, the dirty data is not lost. As a result, as in the case of the processing in step S25, it is possible to guarantee saving of the dirty data concerning the memory bank 133 exceeding the dirty data limit value.

Fourth Embodiment

In step S25 of the cache control processing illustrated in FIG. 7, the cache memory 13 set as the supply targets of electric power from the backup power supply by the battery units 19 is fixed to the cache memory A. However, in step S25, the two memory controllers 121 may perform communication each other via the cache-to-cache signal line 17 to thereby determine the cache memory 13 temporarily excluded from the supply targets of electric power from the backup power supply.

For example, it is assumed that the number of the memory banks 133 that store dirty data in the cache memory A is eighteen and the number of the memory banks 133 that store dirty data in the cache memory B is sixteen. It is assumed that the dirty data limit value is changed from nineteen to twelve in this state. Therefore, it is necessary in the cache memory A to transfer the dirty data of the six memory banks 133, and it is necessary in the cache memory B to transfer the dirty data of the four memory banks 133.

Therefore, the memory controllers A and B set the cache memory A or the cache memory B having a smaller amount of dirty data written therein as a supply targets of electric power from the backup power supply by the battery units 19. It is assumed that, for example, the cache memory A is not set as the supply targets of electric power. In this case, a copy of data of the cache memory A exists in the mirror area 131 of the cache memory B. Therefore, in this case, irrespective of which of the cache memory A and the cache memory B is set as the supply source of electric power, it is necessary to save data of the mirror area 131 of the cache memory in the disk arrays 16. An amount of data of the mirror area 131 is the same in the cache memory A and the cache memory B. Therefore, which of the cache memory A and the cache memory B is set as the supply targets of electric power is determined based on the number of memory banks 133 that store dirty data in the local area 132 of the cache memory.

In this case, the memory controllers A and B determine in step S25 that the cache memory B has a smaller number of the memory banks 133 to which data is to be transferred, in other words, a smaller dirty data amount. Therefore, the memory controllers A and B set the cache memory B having the smaller dirty data amount as the supply targets of electric power from the backup power supply by the battery units 19.

Consequently, in addition to the limitation of the supply targets of electric power from the backup power supply, it is possible to further reduce transfer time of dirty data and more surely guarantee saving of dirty data concerning the memory bank 133 exceeding the dirty data limit value.

Fifth Embodiment

In the disk array apparatus 1 illustrated in FIG. 1, the dirty data limit flags "1" are set in a descending order of the memory bank Nos. of the memory banks 133, in other words, in order from the memory bank No. #32. However, the memory banks 133 in which the dirty data limit flags "1" are set, in other words, the memory banks 133 that write dirty data in the disk arrays 16 may be determined based on dirty data amounts of the respective memory banks 133.

FIGS. 8A and 8B are diagrams illustrating states of storage of dirty data in the memory banks 133 of the local area 132 of the cache memory 13.

As illustrated in FIG. 8A, for example, in a state in which the dirty data limit value is nineteen, dirty data is stored in the memory banks #1 to #19. In FIGS. 8A and 8B and FIGS. 9A and 9B, which are explained later, dirty data amounts in the memory banks #1 to #32 are indicated by hatching. The dirty data amounts in the memory banks #1 to #32 are different from one another. It is assumed that dirty data is not stored in the memory banks #20 to #32 without hatching. It is assumed that dirty data amounts of the memory banks #3, #5, #8, #10, #13, #15, and #17 are smaller than dirty data amounts of the other memory banks 133.

It is assumed that, in this state, the dirty data limit value is changed from nineteen to twelve. Therefore, it is necessary to change the dirty data limit flags from "0" to "1" concerning the seven memory banks 133. Therefore, the memory controller 121 decides, for each of the plurality of memory banks 133, priorities in order with small amount of dirty data written in each of the plurality of memory banks. The memory controller 121 writes the dirty data, which is stored in the plurality of memory banks 133, in the disk array according to the priorities.

In this case, the memory controller 121 determines, based on dirty data amounts of the memory banks 133, the memory banks 133 in which the dirty data limit flags "1" are set. Therefore, as indicated by dotted lines surrounding the memory banks in FIG. 8B, the memory controller 121 determines the memory banks #3, #5, #8, #10, #13, #15, and #17 having smaller dirty data amounts as the memory banks 133 in which the dirty data limit flags "1" are set.

Then, for example, in step S27 of the cache control processing illustrated in FIG. 7, the memory controller 121 writes the dirty data of the memory banks #3, #5, #8, #10, #13, #15, and #17 in the disk arrays 16.

Consequently, in addition to the limitation of the supply targets of electric power from the backup power supply, it is possible to further reduce transfer time of dirty data and more surely guarantee saving of dirty data concerning the memory bank 133 exceeding the dirty data limit value. Further, it is possible to more quickly release the memory banks 133 by reducing the transfer time of the dirty data.

Sixth Embodiment

In the disk array apparatus 1 illustrated in FIG. 1, the dirty data limit flag "1" is set for each of the memory banks 133. On the other hand, the memory banks 133 having the dirty data limit flags "0" are not always filled with dirty data. In other words, in some case, the memory banks 133 having the dirty data limit flags "0" store read data or are "empty". Therefore, dirty data may be concentratedly written in the memory banks 133 having the dirty data limit flags "0". In other words, dirty data once written in the memory banks 133 may be rearranged, whereby the number of the memory banks 133 that store the dirty data is minimized.

Figure 9A:
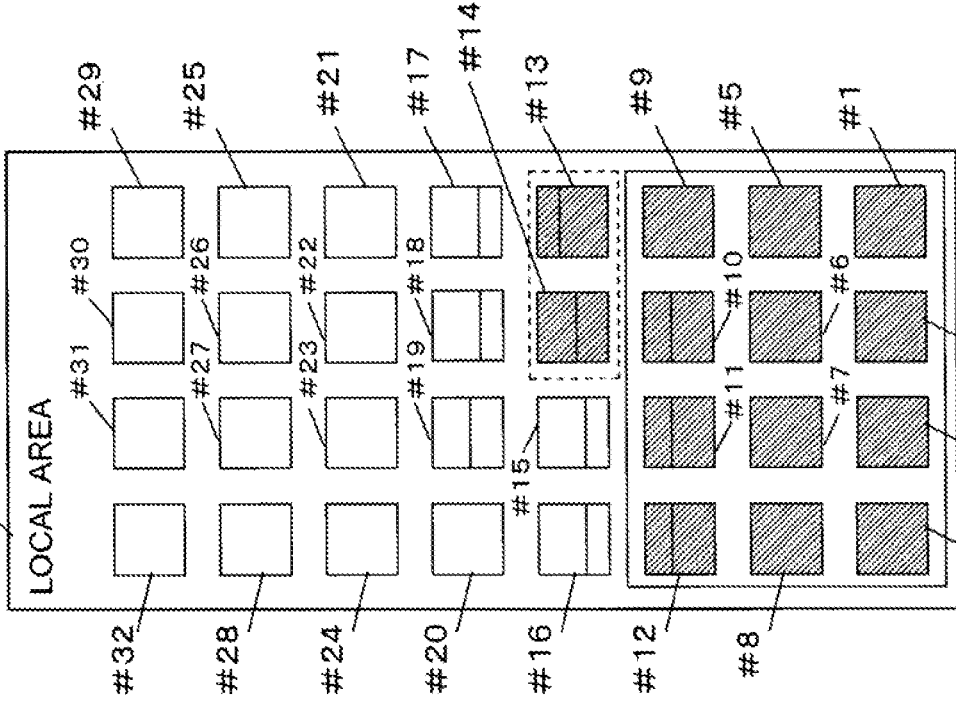
FIGS. 9A and 9B are diagrams for explaining data storage in the local area on the cache memory.
Figure 9B:
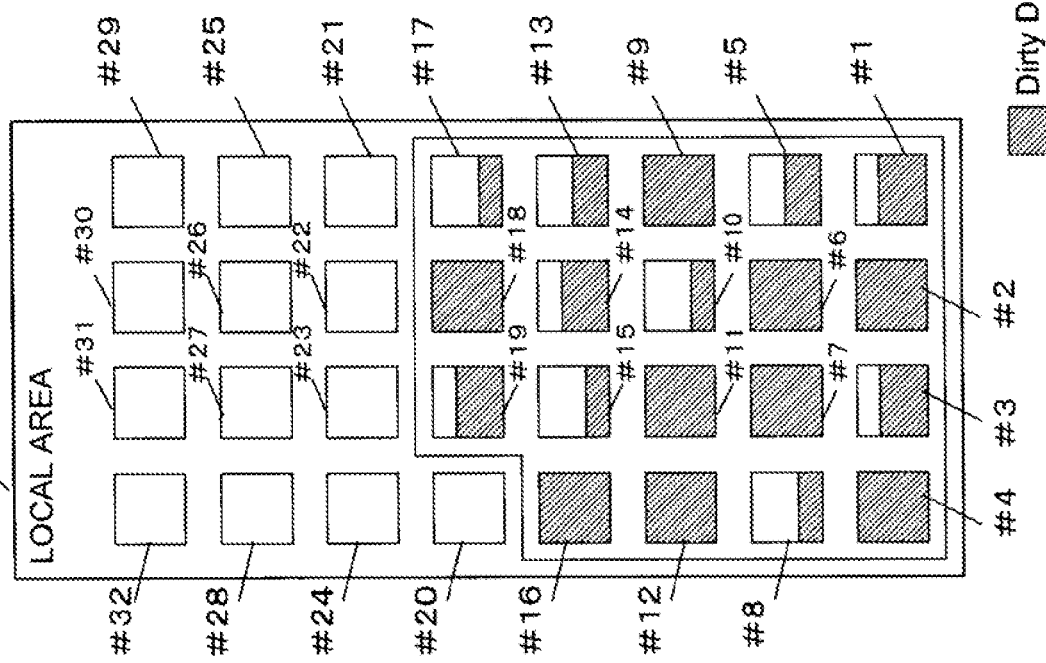

FIGS. 9A and 9B are diagrams illustrating states of storage of dirty data in the memory banks 133 of the local area 132 of the cache memory 13.

As illustrated in FIG. 9A, for example, in a state in which the dirty data limit value is nineteen, dirty data is stored in the memory banks #1 to #19.

It is assumed that, in this state, the dirty data limit value is changed from nineteen to twelve. Therefore, when the cache memory 13 is in the state of FIG. 9A, it is necessary to change the dirty data limit flags from "0" to "1" concerning the seven memory banks 133.

However, prior to the change of the dirty data limit value, as illustrated in FIG. 9B, the memory controller 121 executes rearrangement of dirty data. It is assumed that, according to this rearrangement, for example, dirty data having size equal to memory capacities of the memory banks #1 to #14 are stored in the memory banks #1 to #14 and the dirty data does not exist in the memory banks #15 to #19.

In this case, according to the change of the dirty data limit value from nineteen to twelve, for example, in step S27 of the cache control processing illustrated in FIG. 7, the memory controller 121 writes the dirty data of the memory banks #13 and #14 in the disk arrays 16. Therefore, the number of memory banks 133 from which dirty data is written in the disk arrays 16 is reduced from seven before the rearrangement of the dirty data to two.

Consequently, in addition to the limitation of the supply targets of electric power from the backup power supply, it is possible to further reduce transfer time of dirty data and more surely guarantee saving of dirty data concerning the memory bank 133 exceeding the dirty data limit value.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the sprit and scope of the invention.

What is claimed is:

1. A method for controlling a disk array apparatus comprising a disk array, a cache memory, a battery that supplies electric power to the cache memory during an electric power failure of a main power supply, and a cache controller that stores data in the cache memory, the method for controlling the disk array apparatus comprising:

dividing the cache memory into a plurality of memory banks;

acquiring power supply capacity information indicating power supply capacity of the battery at an update period;

setting a ratio of a permitted area and an inhibited area in the cache memory according to the power supply capacity information when the power supply capacity information is acquired, the permitted area being an area in which the writing of dirty data is permitted, the inhibited area being an area in which the writing of the dirty data is inhibited, the dirty data being write data that is to be written in the disk array and is not written in the disk array;

setting, for each of the plurality of memory banks, identification information indicating whether the memory bank is the inhibited area or the permitted area in a cache table to set a number of the permitted areas according to the ratio; and storing, based on the cache table, the dirty data and read data in a memory bank set as the permitted area, and storing only the read data in a memory bank set as the inhibited area, the read data being read out from the disk array, wherein the cache controller has a plurality of thresholds which includes a maximum threshold, a minimum threshold, and one or more thresholds that are larger than the minimum threshold but smaller than the maximum threshold, and wherein:

when the power supply capacity information is larger than the maximum threshold, the cache controller sets the ratio so as to set all of the plurality of memory banks as the permitted areas, and operates in a write-back state in which the write data is stored in the disk array after storing the write data in the cache memory and notifying a request source of a write request for the write data of completion of writing, whereby only the permitted areas exist in the cache memory and the dirty data is stored in all of the plurality of memory banks that are set as the permitted areas in the write-back state and the read data is stored in all of the plurality of memory banks, when the power supply capacity information is larger than the minimum threshold but smaller than the maximum threshold, the cache controller sets the ratio so as to set a part of the plurality of memory banks as the permitted areas and the other part as the inhibited area according to a threshold which is smaller than and nearest to the power supply capacity information, and operates in the write-back state, whereby both the permitted areas and the inhibited areas exist in the cache memory and the dirty data is stored in the part of the plurality of memory banks that are set as the permitted areas in the write-back state and the read data is stored in all of the plurality of memory banks, and when the power supply capacity information is smaller than the minimum threshold, the cache controller sets the ratio so as to set all of the plurality of memory banks as the inhibited areas, and operates in a write-through state in which the write data is stored once in the cache memory, the write data that is stored once in the cache memory is stored in the disk array, and completion of writing is notified to the request source of the write request for the write data after the write data is stored in the disk array, whereby only the inhibited areas exist in the cache memory and the dirty data is stored in the disk array in the write-through state and the read data is stored in all of the plurality of memory banks.

2. The method for controlling the disk array apparatus according to claim 1, wherein the cache controller decides, for each of the plurality of memory banks, priorities in order with small amount of the dirty data written in each of the plurality of memory banks, and writes the dirty data that is stored in the plurality of memory banks in the disk array according to the priorities.

3. The method for controlling the disk array apparatus according to claim z, wherein the cache controller rearranges the dirty data stored in the plurality of memory banks to minimize a number of the memory banks in which the dirty data is stored.

4. The method for controlling the disk array apparatus according to claim 1, wherein:

the cache memory further comprises a first cache memory including a local area and a mirror area in which a copy of data of a local area of a second cache memory is stored, and the second cache memory including the local area and a mirror area in which a copy of data of the local area of the first cache memory is stored, the cache controller further comprises a first cache controller provided to correspond to the first cache memory, and a second cache controller provided to correspond to the second cache memory and connected to the first cache controller, the first cache controller divides the local area into the plurality of memory banks in the first cache memory, and sets, for each of the memory banks, the identification information in a cache table of the first cache memory whereby the number of the permitted areas is set according to the power supply capacity information, the second cache controller divides the local area into the plurality of memory banks in the second cache memory, and sets, for each of the memory banks, the identification information in a cache table of the second cache memory whereby the number of permitted areas is set according to the power supply capacity information, and the first cache controller and second cache controller copy data stored in the local area of the first cache memory to the mirror area of the second cache memory, and copy data stored in the local area of the second cache memory to the mirror area of the first cache memory.

5. The method for controlling the disk array apparatus according to claim 4, wherein, when the dirty data is stored in a memory bank that is changed from the permitted area to the inhibited area, the cache controller sets one of the first cache memory and the second cache memory as a supply targets of a backup power supply by the battery when electric power failure of a main power supply occurs, until the dirty data stored in the memory bank that is changed from the permitted area to the inhibited area is written in the disk array.

6. The method for controlling the disk array apparatus according to claim 5, wherein the cache controller sets one of the first cache memory and the second cache memory having a smaller amount of the dirty data that is written therein as the supply targets of the backup power supply by the battery.

7. The method for controlling the disk array apparatus according to claim 4, wherein, when the dirty data is stored in a memory bank that is changed from the permitted area to the inhibited area, cache controller sets only the local areas of the first cache memory and the local area of the second cache memory as supply targets of the backup power supply by the battery until the dirty data stored in the memory bank that is changed from the permitted area to the inhibited area is written in the disk array.

8. A disk array apparatus comprising:

a disk array;

a cache memory for storing read data and dirty data, the read data being read out from the disk array, the dirty data being write data that is to be written in the disk array and is not written in the disk array;

a battery for supplying electric power to the cache memory during electric power failure of a main power supply; and a cache controller for dividing the cache memory into a plurality of memory banks, acquiring power supply capacity information indicating power supply capacity of the battery at an update period, setting, when the power supply capacity information is acquired, a ratio of a permitted area and an inhibited area in the cache memory according to the power supply capacity information, the permitted area being an area in which the writing of dirty data is permitted, the inhibited area being an area in which the writing of the dirty data is inhibited, the dirty data being write data that is to be written in the disk array and is not written in the disk array, setting, for each of the plurality of memory banks, identification information indicating whether the memory bank is the inhibited area or the permitted area in a cache table to set a number of the permitted areas according to the power supply capacity information ratio, and storing, based on the cache table, the dirty data and read data in a memory bank set as the permitted area, and storing only the read data in a memory bank set as the inhibited area, the read data being read out from the disk array, wherein the cache controller has a plurality of thresholds which includes a maximum threshold, a minimum threshold, and one or more thresholds that are larger than the minimum threshold but smaller than the maximum threshold, and wherein:

when the power supply capacity information is larger than the maximum threshold, the cache controller sets the ratio so as to set all of the plurality of memory banks as the permitted areas, and operates in a write-back state in which the write data is stored in the disk array after storing the write data in the cache memory and notifying a request source of a write request for the write data of completion of writing, whereby only the permitted areas exist in the cache memory and the dirty data is stored in all of the plurality of memory banks that are set as the permitted areas in the write-back state and the read data is stored in all of the plurality of memory banks, when the power supply capacity information is larger than the minimum threshold but smaller than the maximum threshold, the cache controller sets the ratio so as to set a part of the plurality of memory banks as the permitted areas and the other part as the inhibited area according to a threshold which is smaller than and nearest to the power supply capacity information, and operates in the write-back state, whereby both the permitted areas and the inhibited areas exist in the cache memory and the dirty data is stored in the part of the plurality of memory banks that are set as the permitted areas in the write-back state and the read data is stored in all of the plurality of memory banks, and when the power supply capacity information is smaller than the minimum threshold, the cache controller sets the ratio so as to set all of the plurality of memory banks as the inhibited areas, and operates in a write-through state in which the write data is stored once in the cache memory, the write data that is stored once in the cache memory is stored in the disk array, and completion of writing is notified to the request source of the write request for the write data after the write data is stored in the disk array, whereby only the inhibited areas exist in the cache memory and the dirty data is stored in the disk array in the write-through state and the read data is stored in all of the plurality of memory banks.

9. A storage apparatus comprising:

nonvolatile memories having lower speed than that of a cache memory;

a cache memory for storing read data and dirty data, the read data being read out from the nonvolatile memories, the dirty data being write data that is to be written in the nonvolatile memories and is not written in the nonvolatile memories;

a battery for supplying electric power to the cache memory during electric power failure of a main power supply; and a cache controller for dividing the cache memory into a plurality of memory banks, acquiring power supply capacity information indicating power supply capacity of the battery at an update period, setting, when the power supply capacity information is acquired, a ratio of a permitted area and an inhibited area in the cache memory according to the power supply capacity information, the permitted area being an area in which the writing of dirty data is permitted, the inhibited area being an area in which the writing of the dirty data is inhibited, the dirty data being write data that is to be written in the nonvolatile memories and is not written in the nonvolatile memories, setting, for each of the plurality of memory banks, identification information indicating whether the memory bank is the inhibited area or the permitted area in a cache table to set a number of the permitted areas according to the power supply capacity information ratio, and storing, based on the cache table, the dirty data and read data in a memory bank set as the permitted area, and storing only the read data in a memory bank set as the inhibited area, the read data being read out from the nonvolatile memories, wherein the cache controller has a plurality of thresholds which includes a maximum threshold, a minimum threshold, and one or more thresholds that are larger than the minimum threshold but smaller than the maximum threshold, and wherein:

when the power supply capacity information is larger than the maximum threshold, the cache controller sets the ratio so as to set all of the plurality of memory banks as the permitted areas, and operates in a write-back state in which the write data is stored in the nonvolatile memories after storing the write data in the cache memory and notifying a request source of a write request for the write data of completion of writing, whereby only the permitted areas exist in the cache memory and the dirty data is stored in all of the plurality of memory banks that are set as the permitted areas in the write-back state and the read data is stored in all of the plurality of memory banks, when the power supply capacity information is larger than the minimum threshold but smaller than the maximum threshold, the cache controller sets the ratio so as to set a part of the plurality of memory banks as the permitted areas and the other part as the inhibited area according to a threshold which is smaller than and nearest to the power supply capacity information, and operates in the write-back state, whereby both the permitted areas and the inhibited areas exist in the cache memory and the dirty data is stored in the part of the plurality of memory banks that are set as the permitted areas in the write-back state and the read data is stored in all of the plurality of memory banks, and when the power supply capacity information is smaller than the minimum threshold, the cache controller sets the ratio so as to set all of the plurality of memory banks as the inhibited areas, and operates in a write-through state in which the write data is stored once in the cache memory, the write data that is stored once in the cache memory is stored in the nonvolatile memories, and completion of writing is notified to the request source of the write request for the write data after the write data is stored in the nonvolatile memories, whereby only the inhibited areas exist in the cache memory and the dirty data is stored in the nonvolatile memories in the write-through state and the read data is stored in all of the plurality of memory banks.

* * * * *